United States Patent [19]

Farmer

[11] Patent Number: 4,580,844
[45] Date of Patent: Apr. 8, 1986

[54] GRAIN HAULER TRAILER

[76] Inventor: John T. Farmer, Post Office Box 347, Pond Creek, Okla. 73766

[21] Appl. No.: 148,198

[22] Filed: May 9, 1980

[51] Int. Cl.[4] .............................................. B60P 1/16
[52] U.S. Cl. ..................................................... 298/8 T
[58] Field of Search ............... 105/239, 261 R, 261 A, 105/280; 298/8 R, 8 T, 11, 17 R, 23 R, 17 B, 17 S, 17 SG, 17.5, 17.6

[56] References Cited

U.S. PATENT DOCUMENTS

| | | | |
|---|---|---|---|
| 2,943,754 | 7/1960 | Keys | 293/23 R X |
| 3,181,914 | 5/1965 | Humes | 298/17 R |
| 3,788,702 | 1/1974 | Toboll | 105/261 A X |
| 4,059,307 | 11/1977 | Neufeldt | 105/261 A X |

FOREIGN PATENT DOCUMENTS 724524 12/1965 Canada ............................... 298/17S Primary Examiner—Duane A. Reger
Attorney, Agent, or Firm—Head, Johnson & Stevenson

[57] ABSTRACT

A grain hauler trailer comprising an under belly compartment in open communication with an upper compartment for receiving large quantities of grain therein and maintaining a low center of gravity for the trailer to facilitate movement of the heavy load along the highway, the trailer being pivotally mounted on a wheel truck assembly for facilitating fabrication of the trailer and unloading of the grain from the storage compartments. The upper compartment is closed by a plate member which may be utilized for supporting additional materials during transportation of the grain, and an access port is provided in the plate member for loading of the grain into the compartments. A discharge port is provided in the rear portion of the storage compartments for discharge of the grain therefrom as the trailer is pivoted to a substantially vertical position during the unloading operation.

6 Claims, 8 Drawing Figures

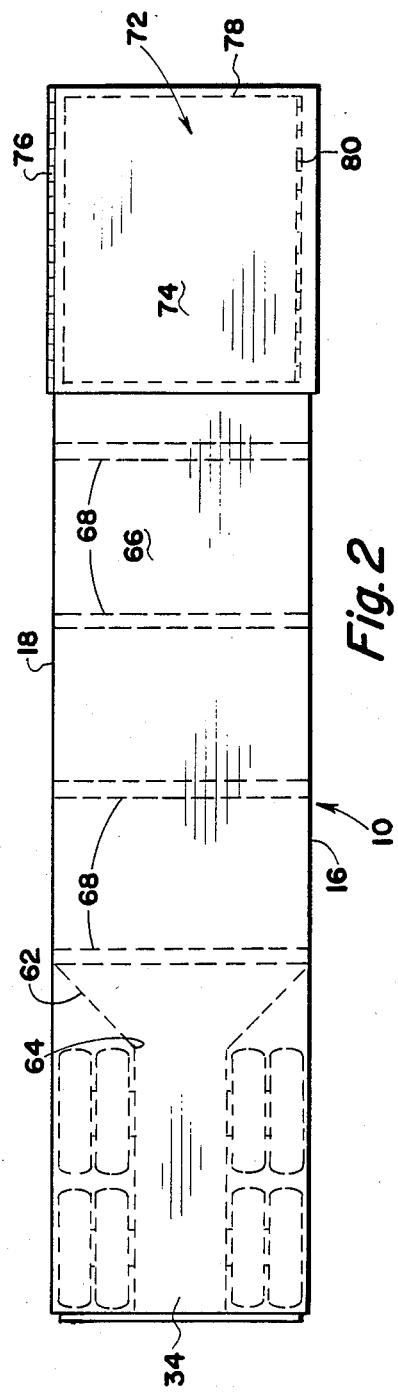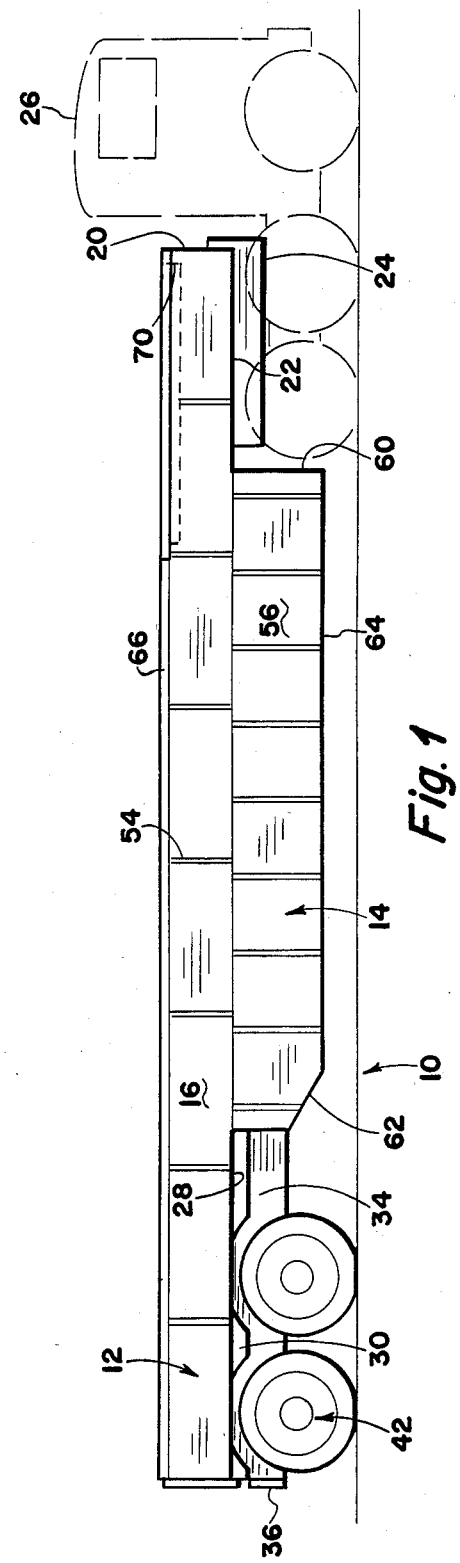

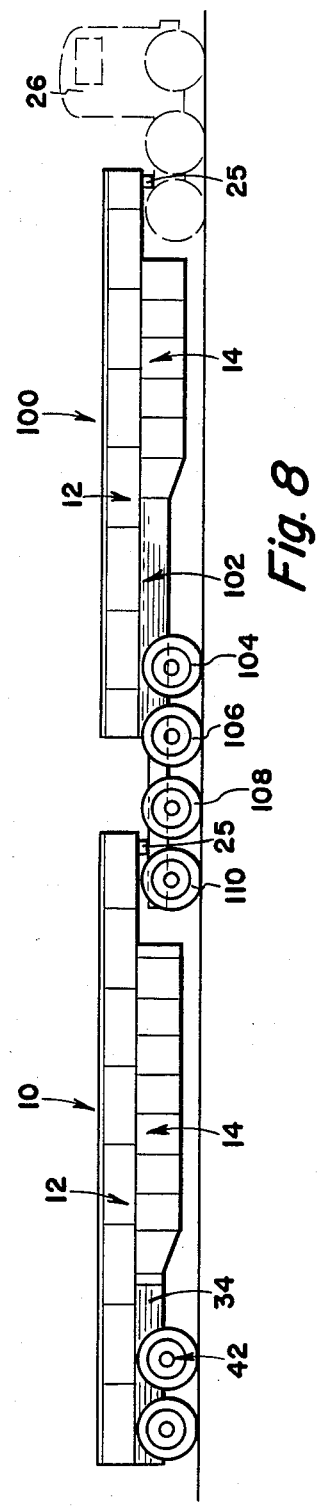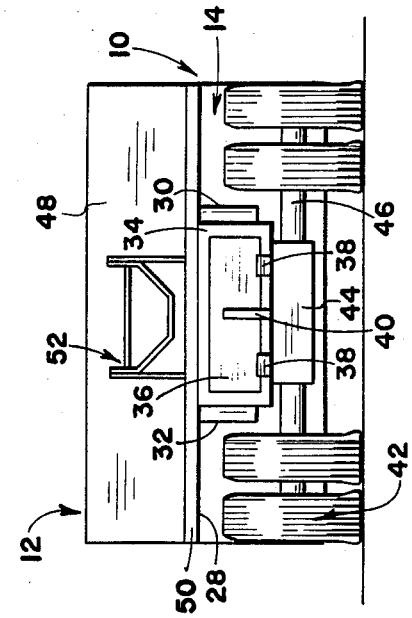

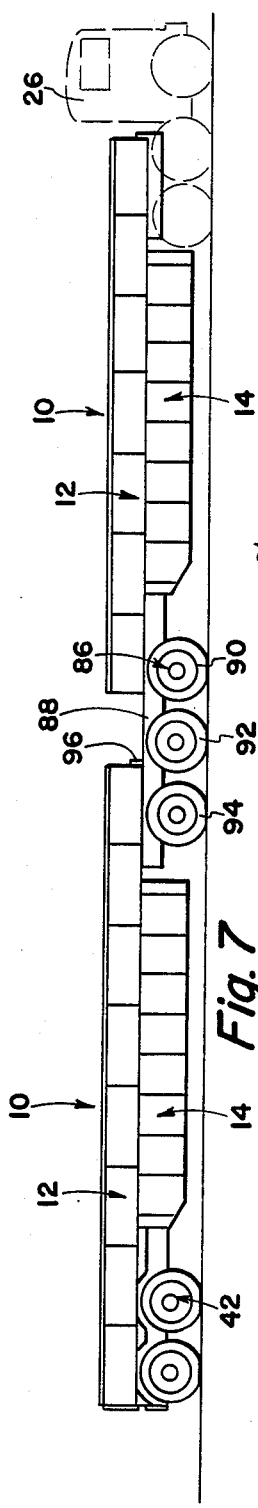
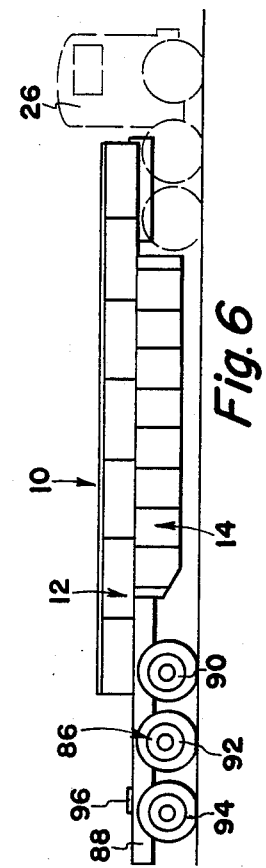
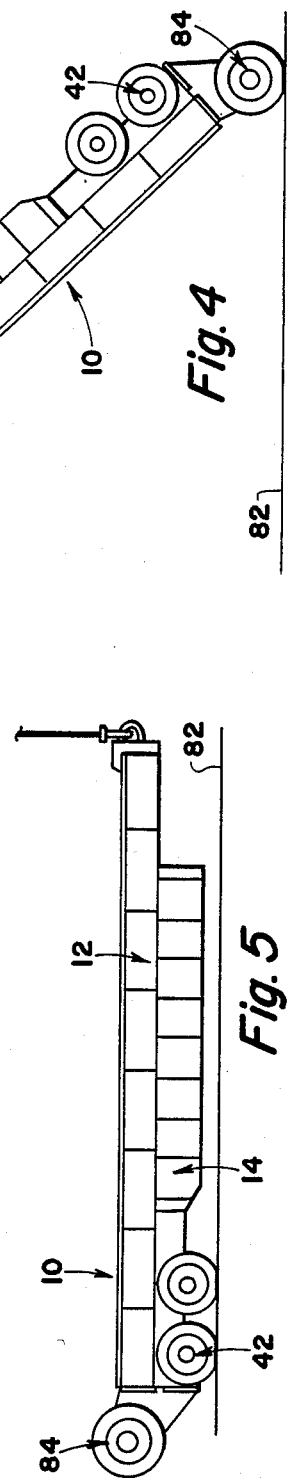
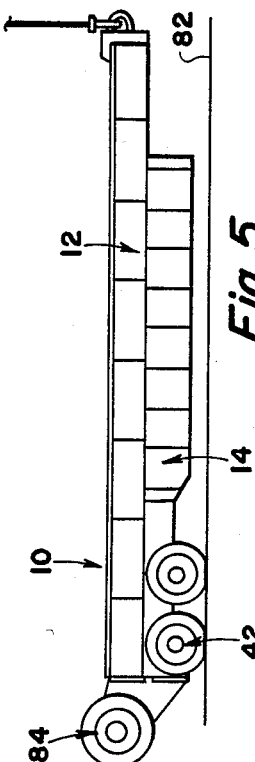

GRAIN HAULER TRAILER

BACKGROUND OF THE INVENTION

1. Field of the Invention

This invention relates to improvements in grain haulers and more particularly, but not by way of limitation, to a grain hauler for carrying large quantities of grain in a single load.

2. Description of the Prior Art

The improvements in the agricultural industry coupled with the ever increasing world population has resulted in bountiful grain crops, and these great quantities of grain must be moved from the site of the growing fields to the site of food production. The present day methods of moving large quantities of grain over the highways is very inefficient. The usual method of transporting the grain comprises the filling of the usual highway trailers which are towed over the highways behind the usual tractor units, and the weight of the great quantities of grain which are loaded into the trailers creates a problem, not only in the power required of the tractor moving the trailer, but also the dimensional characteristics of the trailer and weight of the grains loaded thereon frequently creates a relatively high center of gravity, and great instability of the trailer moving along the roadways. As a result, the trailer frequently sways and may turn over, thus causing a loss of the much needed grain.

SUMMARY OF THE INVENTION

The present invention relates to a novel grain hauler trailer which has been particularly designed and constructed for overcoming the foregoing disadvantages. The novel trailer comprises an under belly compartment in open communication with an upper compartment, with both compartments designed for receiving and storing a relatively large quantity of grain. The provision of the under belly maintains a low center of gravity for the loaded trailer, thus greatly improving the road handling properties of the filled or loaded trailer. In addition, the low profile of the trailer permits the transporting of additional materials above the grain load, thus improving the efficiency of operation of the trailer, which is particularly important in the light of the current energy problems. The trailer is pivotally secured to a wheel truck unit whereby the entire body of the trailer may be pivoted to a substantially upright position during the unloading of the grain through a discharge means provided at the rear of each compartment. The upper compartment is closed by a suitable floor plate means which supports any additional materials to be loaded above the grain storage compartments, and access port means is provided in the plate for facilitating the loading of the grain into the compartments.

In addition, the fabrication of the trailer is unique in that the body of the trailer may be constructed in a ground level, upside-down, horizontal position which greatly facilitates the fabrication of the trailer. Subsequent to the construction of the trailer, the body of the trailer may be pivoted by a suitable hoist about a removable wheel assembly which is secured to the rear end of the trailer, and upon the "righting" of the completed trailer body, the forward end of the trailer may be supported by the hoisting apparatus which the trailer is operably connected with the usual fifth wheel of the usual towing tractor unit. The novel grain hauler trailer is simple and efficient in operation and economical and durable in construction.

BRIEF DESCRIPTION OF THE DRAWINGS

FIG. 1 is a side elevational view of a grain hauler trailer embodying the invention, with the towing tractor depicted in broken lines for purposes of illustration.

FIG. 2 is a plan view of a grain hauler trailer embodying the invention.

FIG. 3 is a rear view of a grain hauler trailer embodying the invention.

FIG. 4 is a side elevational view of a grain hauler trailer embodying the invention, and illustrating one step in the method of fabricating the trailer.

FIG. 5 is a side elevational view of a grain hauler trailer embodying the invention and illustrates another step in the method of fabricating the trailer.

FIG. 6 is a side elevational view of a grain hauler trailer embodying the invention with the towing tractor depicted in broken lines for purposes of illustration and showing the trailer as arranged for connection with a second trailer.

FIG. 7 is a side elevational view of a pair of grain hauler trailers embodying the invention as connected in tandem and showing the towing tractor in broken lines for purposes of illustration.

FIG. 8 is a view similar to FIG. 7 illustrating a modified grain hauler trailer embodying the invention.

DESCRIPTION OF THE PREFERRED EMBODIMENT

Referring to the drawing in detail, and particularly FIGS. 1, 2 and 3, reference character 10 generally indicates a grain hauler trailer comprising a body 11 having a first substantially rectangular box-like housing 12 in open communication with a second substantially rectangular box-like housing 14 disposed therebelow, said housing cooperating to provide a body for the trailer 10. The first housing 12 comprises a pair of oppositely disposed mutually parallel sidewalls 16 and 18 having a forward end wall 20 welded or otherwise secured therebetween for closing of the front end of the compartment 12. A first bottom plate 22 is welded or otherwise rigidly secured between the sideplates 16 and 18 and forward end plate 20 and extends rearwardly into connection with the leading or forward end of the second housing 14. In addition, it is preferable to provide a reinforcing channel or framework 24 suitably secured to the plate 22 having the usual king pin 25 (FIG. 9) for operably connecting the trailer 10 to a suitable towing tractor 26, as is well known and as will be hereinafter set forth in detail. A second bottom plate 28 is rigidly secured between the side walls 16 and 18 in any suitable manner, and extends from the outermost or rearward ends thereof into connection with the trailing or rear end of the housing 14. In addition, a pair of spaced mutually parallel flanges 30 and 32 are welded or otherwise rigidly secured to the outer surface of the plate 28 for securing a hollow chute housing to the rearward end of the housing 14.

The chute housing 34 is open at both ends, with one end being in open communication with the interior of the housing 14 and the opposite end open for discharging materials therethrough as will be hereinafter set forth. A suitable door 36 is hingedly secured to the open discharge end of the chute 36 in any well known manner, such as by a plurality of hinges 38, and a suitable locking means 40 is secured between the chute 34 and the door 36 for securely locking the door in the closed position thereof when the materials are not being discharged from the chute.

The housing 12 is pivotally secured to a suitable wheeled truck assembly 42 in such a manner that the housing 12 and 14 may be pivoted through at least a 180° arc for a purpose as will be hereinafter set forth. Whereas the housing 12 may be pivotally secured to the truck assembly 42 in any suitable manner, as shown herein a sleeve or trunnion 44 is rigidly secured to the lower outer surface of the chute 34 as particularly shown in FIG. 3, and extends transversely thereacross for receiving one axle 46 of the truck 42 therethrough. In this manner not only does the truck 42 support the rear end of the trailer 10 during use thereof, but also the housing 12 and 14 may be pivoted about the longitudinal axis of the axle 46 when desired during operation of the trailer 10. In addition, a suitable discharge door means 48 is hingedly secured to the plate 28 in any well known manner, such as by a longitudinally extending hinge means 50, and is retained in a normal closed position against the rearwardly disposed ends of the sidewalls 16 and 18 by a suitable locking means 52. Of course, it may be desirable to provide a plurality of spaced reinforcing bars 54 rigidly secured to the sidewalls 16 and 18, as is well known, for enhancing the strength of the container or housing 12.

The housing 14 comprises a pair of spaced mutually parallel sidewalls 56 and 58 having the forward ends thereof connected together by an end wall 60. The rearward ends of the sidewalls 56 and 58 are connected together by a substantially funnel shaped element 62 which terminates in an opening 64 (FIG. 1) providing communication between the interior of the housing 14 and the chute 34. The upper end or side of the housing 14 is open and the peripheral edges thereof are welded or otherwise rigidly secured to the uncovered portion of the bottom of the housing 12 in any suitable manner, such as by securing the upper edges of the sidewalls 56 and 58 to the lower edges of the sidewalls 16 and 18, respectively, and securing the upper end or edge of the plate 60 and funnel member 62 to the inner ends of the plates 22 and 28, respectively. In this manner the housing 14 is secured below the housing 12 in the normal relative positions therebetween, and the interior of the housing 12 is open to the interior of the housing 14.

The upper end or side of the housing 12 is closed by a plate member 66 which may be suitably rigidly secured to the upper edges of the sidewalls 16 and 18 and front end member 20. It is also preferable to provide a plurality of transversely extending cross members 68 extending between the sidewalls 16 and 18 for strength and rigidity of the housing 12. An access port 70 (FIG. 1) is provided in the plate 68, preferably in the proximity of the forward end of the housing 12, but not limited thereto, and a double-walled access door 72 is secured to the housing 12 for sealing engagement with the port 70 in the closed position therebetween. The access door 72 may be of any suitable type, but as shown herein comprises a first outer door 74 hingedly secured along one edge to the sidewall 18 by a suitable hinge means 76. A second inner door 78, preferably of smaller dimensions than the outer door 74, but of dimensions corresponding to the access port 70, is hingedly secured to the sidewall 16 by a suitable hinge means 80. In addition, it is preferable to provide suitable sealing means (not shown) at the peripheral edges of each of the doors 74 and 78 for precluding leakage at the access port 70 when the door assembly 72 is in the closed position. In order to open the door assembly 72, the outer door 74 may be initially opened by pivoting thereof about the axis of the hinge means 76, thus exposing the inner door 78. The inner door 78 may then be opened by pivoting thereof about the axis of the hinge means 80, thus providing access to the interior of the housing 12 through the access port 70. The procedure may be reversed for closing of the door assembly 72.

In use the trailer 10 may be connected with the towing tractor 26 by connecting the king pin 25 with the usual fifth wheel (not shown) of the towing vehicle, thus providing a tractor-trailer unit as shown in FIG. 1. The wheel truck assembly 42 provides the rear wheels for the overall unit, and it will be noted that whereas the forward and rear portions of the first housing 12 extend above the wheel truck 42 and the wheels of the tractor 26, the second housing 14 is interposed between the front and rear wheel assemblies of the overall unit, maintaining a low profile for the unit whereby the center of gravity of the filled or loaded unit is maintained quite low. The door assembly 72 may be opened as hereinbefore set forth to provide access to the interior of the housing 12, and the grain (not shown) or the like to be hauled by the unit as shown in FIG. 1 may be admitted into the housing 12 through the open port 70. Of course, the grain will initially fill the housing 14, and then will fill the housing 12, whereupon the door assembly 72 may be closed for securely retaining the grain within the housings 12 and 14. If desired, an additional load (not shown) may be placed on the upper surface of the plate 66 and secured thereon in the usual or well known manner. The entire load may then be transported along the highways or roadways in the usual manner, it being noted that the provision of a dual grain storage area provides for the hauling of a great quantity of the grain in a single load, and the overall design of the unit maintains a very low center of gravity, thus increasing the efficiency of the transporting of the grain.

When the tractor-trailer unit has reached its destination, and the grain carried in the housings 12 and 14 is to be discharged therefrom, the forward portion of the trailer 10 may be engaged by a suitable hoisting crane in any well known manner, whereupon the trailer may be disconnected from the tractor 26. The hoisting crane may then be utilized in the usual manner for elevating the forward end of the trailer 10 and pivoting the trailer about pivotal connection thereof with the wheel truck assembly 42. The rear doors 36 and 48 may be opened whereby the grain in the housing 14 will be discharged through the chute 34 and through the open door 36 and the grain in the housing 12 will be discharged through the open door 48. When the trailer has been unloaded, the hoisting crane may be utilized in the normal manner for restoring the forward end of the trailer 10 to the normal lowered position thereof for connection thereof with the tractor 26.

Referring now to FIGS. 4 and 5, during fabrication of the trailer 10, the housing 12 may be constructed at ground level by assembling the sidewalls 16 and 18, end wall 20, and rear door 48 to form an open box-like framework. It may then be preferable to secure the cross members 68 between the sidewalls 16 and 18 in the proximity of the open end of the housing 12. Of course, the housing 12 is preferably disposed in an upside down orientation during this initial stage of the construction or fabrication thereof, and as a consequence the open end of the housing 12 will be disposed against the surface of the ground 82 or the like, wherein the fabrication is taking place. It will be readily apparent that this upside down orientation of the housing 12 will facilitate the installation of the plates 22 and 28 on the housing 12, as well as the securing of the housing 14 thereto. The entire fabrication of the unit or trailer 10 may thus be accomplished in the upside down construction position and upon completion of the structure, a removable wheel unit 84 of any well known type may be suitably connected to the rearward portion of the housing 12 and chute 34, whereupon a cable 86 of a suitable hoisting crane (not shown) may be operably connected with the opposite end of the housing 12, and the entire trailer 10 may be pivoted about the axis of the wheel assembly 84, as is particularly illustrated in FIG. 4. A continued pivoting of the trailer 10 about the axis of the wheel assembly 84 will ultimately place the trailer 10 in a completely upright position, as particularly shown in FIG. 5, and whereas the rear portion of the trailer 10 will be supported from the ground 82 by the wheel truck assembly 42, the forward portion of the trailer 10 may be supported by the cable 86 until such time as the king pin 25 is operably connected with the fifth wheel (not shown) of the towing tractor 26. Upon the righting of the trailer 10, the wheel assembly 84 may be removed from connection with the apparatus, and the trailer 10 may be placed in operation.

In the event it is desirable to tow two of the trailers 10 in tandem relation behind the towing tractor 26, as shown in FIG. 7, a connector or coupling wheel assembly 86 may be utilized for securing the rear portion of a first trailer 10 to the front portion of a second trailer 10. The coupling wheel assembly 86 may comprise a suitable support bed apparatus 88 suitably supported by a plurality of in-line pairs of wheels 90, 92 and 94. The chute 34 of the leading trailer 10 may be removably connected with the leading end of the wheel coupling assembly 86 in any well known manner, with the rear portion of the housing 12 preferably extending a sufficient distance along the support bed 88 for being supported above the wheels 90. The usual fifth wheel (indicated at 96 in FIG. 7) is provided on the upper surface of the support bed 88, and the king pin 25 of the trailing trailer 10 may be connected with the fifth wheel 96, thus securing the trailers in tandem relation. Of course it will be apparent that the wheel truck assembly 42 of the leading trailer 10 will be removed when the two trailers are connected in end-to-end relation as shown in FIG. 7.

A modified trailer 100 is shown in FIG. 8, which is generally similar to the trailer 10, and is particularly designed to be secured as a leading trailer in a tandem trailer relationship with a second trailer 10. The trailer 10 includes the housing 12 and housing 14 substantially as hereinbefore set forth. However, the trailer 100 is provided with a modified chute 102 in lieu of the chute 34 previously set forth. The chute 102 is generally similar to the chute 34 and is in communication with the interior of the housing 14 in the same manner as hereinbefore set forth. Essentially the only difference between the chute 102 and the chute 34 is that the chute 102 is elongated with respect to the previously described chute 34, and is operably connected with four pairs of in-line wheel assemblies 104, 106, 108 and 110. In addition, a fifth wheel (not shown) is provided on the upper surface of the rearward portion of the chute 102 for receiving the king pin 25 of the trailer 10 which is to be secured in tandem with the trailer 100. The trailers 10 and 100 may be filled with grain, or the like, as hereinbefore set forth, otherwise loaded, and moved along the highways behind the towing tractor 26 in the usual manner for transporting the load to the desired destination. The trailers 10 and 100 may be emptied of the grain in the same manner as hereinbefore set forth.

From the foregoing it will be apparent that the present invention provides a novel grain hauler trailer wherein a dual grain receiving compartment is arranged in a manner for maintaining a low center of gravity for the loaded trailer. The trailer may be readily secured to a towing vehicle and moved along a highway with efficiency and safety. In addition, two, or more, of the trailers may be secured in tandem relation behind a common towing vehicle, thus further increasing the efficiency of transporting great quantities of grain, or the like, through long distances.

Whereas the present invention has been described in particular relation to the drawings attached hereto, it should be understood that other and further modifications, apart from those shown or suggested herein may be made within the spirit and scope of this invention.

What is claimed is:

1. In combination with a towing vehicle, a loading hauling trailer comprising a body having first and second housing means in open communication to provide a dual load receiving chamber, access port means in communication with the chamber for admission of the load thereto, discharge means in communication with the chamber for discharging the load therefrom, means provided in the body for removably securing one end of the trailer to the towing vehicle, a wheel truck assembly operably secured to the body and cooperating with the towing vehicle for transporting of the trailer from site to site, pivoting wheel means removably secured to the opposite end of the body for facilitating initial positioning of the body prior to connection of the trailer with the towing vehicle, means pivotally securing the body of the wheel truck assembly whereby the body may be pivoted to an angular orientation with respect to the horizontal for facilitating discharging of the load from the chamber by gravity, and one of said housings being disposed below the other of said housings during transporting of the trailer to provide a low center of gravity for the trailer, the uppermost of said housing extending longitudinally beyond both ends of the lower most housing for facilitating securing of at least two trailers in an in-line relationship, wherein one side of the chamber is closed by a load supporting plate means and is the upper surface of the trailer during transporting thereof, and said access port means is provided in said plate means, wherein said access port means comprises an access port provided in said plate means for admitting the load therethrough, and double door means secured in said access port for alternately opening and closing thereof, and wherein the double door means comprises a pair of overlying door members operable in sequence for providing an efficient sealing of the access port in the closed position thereof.

2. In combination with a towing vehicle, a load hauling trailer as set forth in claim 1 wherein one of said doors is hingedly secured to the access port for opening in one pivotal direction, and the other of said doors is individually hingedly secured to the access port for opening in an independent pivotal direction with respect to the first door.

3. In combination with a towing vehicle, a load hauling trailer as set forth in claim 1 wherein the discharge means comprises door means operably secured to one end of the body and open to the dual chamber for discharging the load therethrough upon the angular orientation of the body.

4. In combination with a towing vehicle, a load hauling trailer as set forth in claim 3 wherein the door means comprises a first door provided in one end of the first housing and a second door provided on one end of the second housing.

5. In combination with a towing vehicle, a load hauling trailer as set forth in claim 1 wherein one of said housings is interposed between the wheel truck assembly and the towing vehicle and disposed below the upper limit of the wheel truck assembly during transporting of the trailer for maintaining said low center of gravity therefor.

6. In combination with a towing vehicle, a load hauling trailer as set forth in claim 1 and including independent coupling wheel assembly means adapted to be interposed between a pair of trailers for securing said trailers in said in-line relationship.

* * * * *